July 1, 1930.                C. McC. HARPER                1,769,290
                                LUBRICATOR
                            Filed Oct. 11, 1927
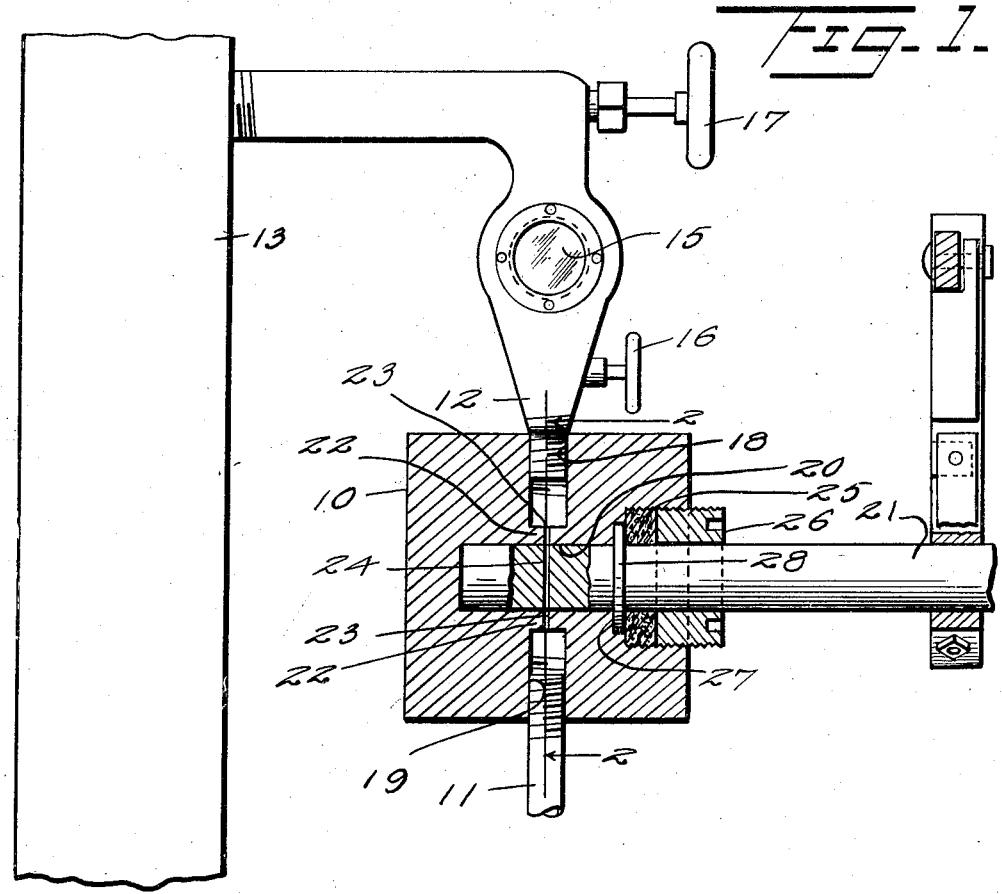
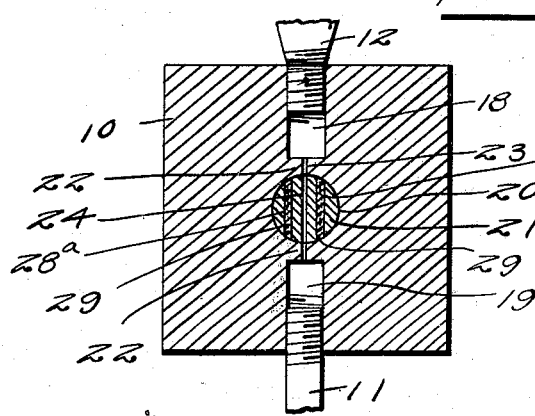
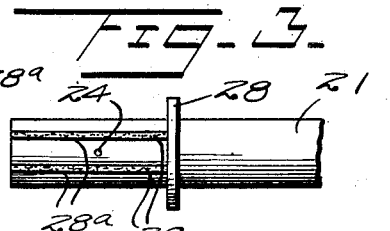
Inventor
C. M. Harper
By Watson E. Coleman
Attorney Patented July 1, 1930

1,769,290

UNITED STATES PATENT OFFICE

CLYDE McCONNEL HARPER, OF BAYTOWN, TEXAS

LUBRICATOR

Application filed October 11, 1927. Serial No. 225,555.

This invention relates to lubricators and more particularly to the lubricators of pressure feed lines, such as are employed for injecting lubricant into the steam lines of engines and turbines.

An important object of the invention is to provide a device of this character which may be very readily and cheaply produced, which will be durable and efficient in service and a general improvement in the art.

These and other objects I attain by the construction shown in the accompanying drawing, wherein for the purpose of illustration is shown a preferred embodiment of my invention and wherein:—

Figure 1 is a vertical sectional view through a lubricator constructed in accordance with my invention;

Figure 2 is a partial section on the line 2—2 of Figure 1;

Figure 3 is a fragmentary plan of the shaft removed.

Referring now more particularly to the drawing, the numeral 10 generally designates a lubricator body and 11 and 12 feed and discharge lines engaged in co-axial bores formed in opposite sides of the body. The feed line, as indicated, is connected with a source of oil under pressure, while the discharge line is connected with the feed pipe 13 of the engine to be lubricated and has arranged therein the usual sight glass 15 and bleeder and cutoff valves 16 and 17. The body has formed therethrough at right angles to the axes of the bores 18 and 19, a bore 20, whose axis intersects the axis of the bores 18 and 19 and in this bore is closely fitted a shaft 21. The inner ends of the bores 18 and 19 terminate short of the wall of the bore 20, leaving webs 22 through which are formed bores 23 alignable with an axial bore 24 formed through the shaft. The outer end of the bore 20 is enlarged to form a packing gland 25 and this enlargement is threaded at its outer end for the reception of a nut 26 for the gland. At the junction of the bore 20 and its enlargement 25, the wall of the bore is preferably rabbetted, as at 27, for the reception of a collar 28 formed upon or secured to the shaft 21, so that the packing serves as a means for preventing longitudinal movement of the shaft which would cause misalignment of the bores 23 and 24 which are preferably very fine. It will be obvious that upon each alignment of the bore 24 with the bore 23, a jet of oil will pass from the inlet to the outlet and so to the feed pipe 13.

In order to prevent leakage of oil about the shaft 21, this shaft is longitudinally slotted at opposite sides of its axis, as indicated at $28^a$, the slots paralleling the bore 24 and extending from the inner end of the shaft to the collar 28. In these slots are disposed packing strips 29, the edges of which project for engagement with the wall of the bore 20. As the packing strips 29 extend from the inner end of the shaft 21 to the collar 8, all danger of the lubricant flowing around the shaft is avoided, and as the slots $28^a$ extend through the inner end of the shaft, the packing strips may be quickly removed and new ones quickly substituted therefor when the shaft is withdrawn from the bore 20.

It will also be obvious that a construction of this character will lend itself very readily to automatic operation by connection with a rotating or reciprocating part of the machine. In the present instance, I have generally designated connections between a reciprocating part of the machine and the shaft which would cause oscillation of the shaft and periodic alignment of the bores 23 and 24. A device of this character may, of course, be very cheaply produced and will be very durable and efficient in service.

Since the construction hereinbefore set forth is capable of a certain range of change and modification without materially departing from the spirit of the invention, I do not limit myself to such specific structure except as hereinafter claimed.

I claim:—

A lubricator comprising a solid body having co-axial bores in opposite sides thereof for the reception of inlet and outlet lines, a third bore at right angles to and extending intermediate the adjacent ends of said first bores, the inner ends of said first bores being spaced from said third bore and connected therewith by minute bores, said third bore having an enlarged outer end portion, a shaft of uniform diameter having its inner end portion arranged in said third bore and provided with a port extending diametrically therethrough and similar in size to said minute bores, a collar formed on the shaft and contacting with the bottom wall of the enlarged portion of said third bore, a packing secured in said enlarged portion and contacting with the collar, the shaft being provided at opposite sides of its port with slots extending longitudinally thereof and arranged in parallel relation to said port, the slots extending from the inner end of the shaft to the collar, and packing strips equal in length to said slots and arranged therein and contacting with the wall of said third bore.

In testimony whereof I hereunto affix my signature.

CLYDE McCONNEL HARPER.